(12) United States Patent
Tsugane

(10) Patent No.: US 9,184,641 B2
(45) Date of Patent: Nov. 10, 2015

(54) ECCENTRICALLY ROTATING APPARATUS

(71) Applicant: Tsugane Machine Company Limited, Yamatoshi, Kanagawaken (JP)

(72) Inventor: Sachio Tsugane, Yamatoshi (JP)

(73) Assignee: Tsugane Machine Company Limited, Kanagawa (JP)

(*) Notice: Subject to any disclaimer, the term of this patent is extended or adjusted under 35 U.S.C. 154(b) by 331 days.

(21) Appl. No.: 13/759,041

(22) Filed: Feb. 5, 2013

(65) Prior Publication Data

US 2013/0241331 A1    Sep. 19, 2013

(30) Foreign Application Priority Data

Feb. 7, 2012  (JP) .................................. 2012-24046

(51) Int. Cl.
| | |
|---|---|
| *H02K 7/06* | (2006.01) |
| *F03G 3/00* | (2006.01) |
| *F03G 3/08* | (2006.01) |
| *F16F 15/04* | (2006.01) |
| *F16F 15/315* | (2006.01) |

(52) U.S. Cl.
CPC ........ *H02K 7/061* (2013.01); *F03G 3/00* (2013.01); *F03G 3/08* (2013.01); *F16F 15/04* (2013.01); *F16F 15/315* (2013.01)

(58) Field of Classification Search
CPC ........................................................ F03G 7/08
USPC ........... 310/81; 290/1 R; 415/916; 185/27–33
See application file for complete search history.

(56) References Cited

U.S. PATENT DOCUMENTS

| | | | | |
|---|---|---|---|---|
| 5,252,870 | A * | 10/1993 | Jacobsen et al. ................ | 310/82 |
| 5,675,197 | A * | 10/1997 | Jacobsen et al. ................ | 310/82 |
| 6,700,248 | B2 * | 3/2004 | Long ............................... | 310/80 |
| 7,969,055 | B2 * | 6/2011 | Titus .............................. | 310/152 |
| 2009/0322094 | A1 * | 12/2009 | Mahawili ........................ | 290/55 |

* cited by examiner

*Primary Examiner* — Naishadh Desai
(74) *Attorney, Agent, or Firm* — Symubs Law Group, LLC; Clifford D. Hyra

(57) ABSTRACT

An eccentrically rotating apparatus has a rotating table 5, a bearing board 4 and a support board 2 spaced apart from each other in a vertical direction and having a common axis C arranged on a base plate 1. The rotating table 5 has a support pole 6 and a weight 7. The support board 2 has a support tip 2a connected to the bearing board 4 with a predetermined space apart and movably arranged on the base plate 1. The apparatus includes a sensor 11 for detecting a position of the weight 7 and a driving unit 9 activated by detected signals from the sensor 11. The rotating table 5 is eccentrically rotated such that the driving unit 9 pushes up the support board 2 at a time when the sensor 11 detects the weight 7.

4 Claims, 5 Drawing Sheets

(a)

(b)

(a)

(b)

ECCENTRICALLY ROTATING APPARATUS

This application claims the benefit of Japanese Patent Application No. 2012-24046, filed Feb. 7, 2012, which is hereby incorporated by reference in its entirety.

FIELD OF INVENTION

The present invention relates to an eccentrically rotating apparatus comprising a table and a weight eccentrically attached to the table, so that an eccentric rotation is induced by upward and downward movements of the weight which causes precessional rotations of the table.

RELATED BACKGROUND ARTS

As one of the conventional generators which utilize eccentric torque, for example, Japanese utility model registered No. 3,170,852 discloses a flywheel attached torque generator. This generator can provide smooth and stable continuous rotations as suppressing uneven rotations by removing reverse torque acted on a rotating driving shaft of the generator.

DISCLOSURE OF THE INVENTION

In conventional eccentrically rotating apparatuses which utilize eccentric torque, since eccentric rotating forces are loaded to rotating shafts of generators, pumps and the like connected to the eccentrically rotating shafts of the apparatuses, unnecessary vibrations are generated in the rotating shafts and unreasonable stresses are loaded on the rotating shafts.

Up to now there have been no disclosures with respect to eccentrically rotating apparatuses which utilize eccentric torque generated and accelerated by repeated upward and downward movements of weights.

The present invention is carried out in view of the problems in the conventional apparatuses so as to provide an eccentrically rotating apparatus, which attains smooth and stable continuous eccentric rotations by reducing stresses loaded to a shaft of a table. The eccentrically rotating apparatus by the present invention utilizes eccentric torque caused by precessional movements of a weight eccentrically arranged on the table.

In order to attain the above-mentioned objectives, embodiments of the present invention provides apparatuses having features of (1) to (4).
(1) An eccentrically rotating apparatus having a rotating table, a bearing board and a support board spaced apart each other in a vertical direction and coaxially arranged on a base plate, wherein: the rotating table has a support pole and a weight; the bearing board has a shaft holding device rotatably holding the support pole; the support board has a support tip connected to the bearing board with a predetermined space apart and movably arranged on the base plate, and a rotating driven body comprising a connecting device connected to the support pole; the apparatus comprises a plurality of springs connected to the base plate for supporting the bearing board, a sensor for detecting a position of the weight and a driving unit activated by detected signals from the sensor; and the rotating table is eccentrically rotated such that the driving unit pushes up the support board at a time when the sensor detects the weight.
(2) The apparatus according to (1), wherein: the connecting device has a universal joint connecting said support pole movably with said support board or a clutch disconnecting the support pole from the support board.
(3) The apparatus according to (1) or (2), wherein: the rotating driven body fixed to the support board comprises a generator or pump connected to the rotating table via the support pole and the connecting device.
(4) The apparatus according to one of (1)-(3), wherein: the apparatus comprises a plurality of driving units and sensors.

Embodiments of the present invention provide an eccentrically rotating apparatus, which utilizes eccentric torque caused by precessional movements of the weight eccentrically attached to the table and can attain smooth and stable continuous eccentric rotations by reducing stresses loaded on the shaft of the table.

EMBODIMENTS OF THE PRESENT INVENTION

Hereinafter, embodiments of the present invention are explained by referring to drawings.

Figure 1:
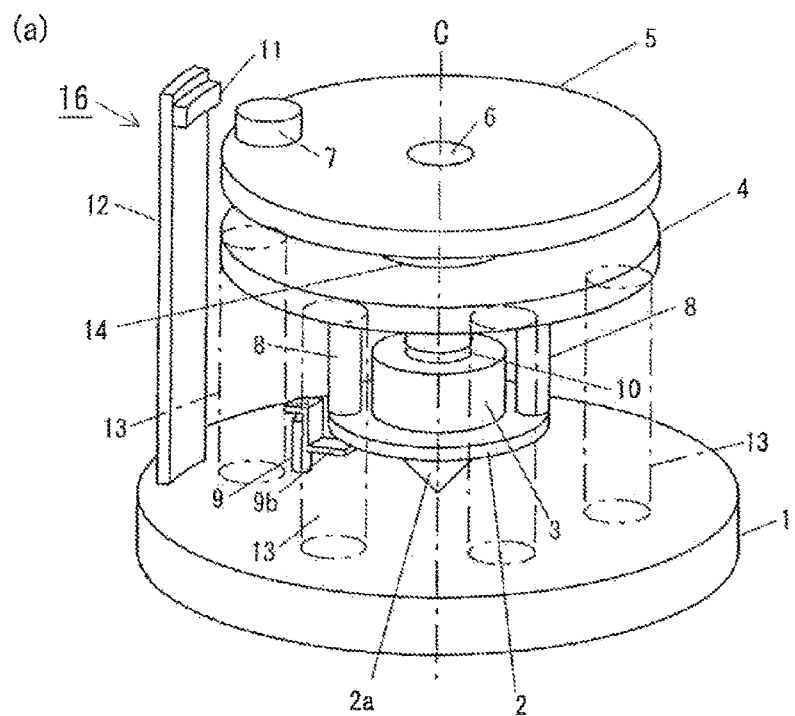
FIG. 1 shows an eccentrically rotating apparatus by the present invention, wherein: (a) is a perspective view of the apparatus and (b) is a sectional view of the apparatus.
Figure 1:
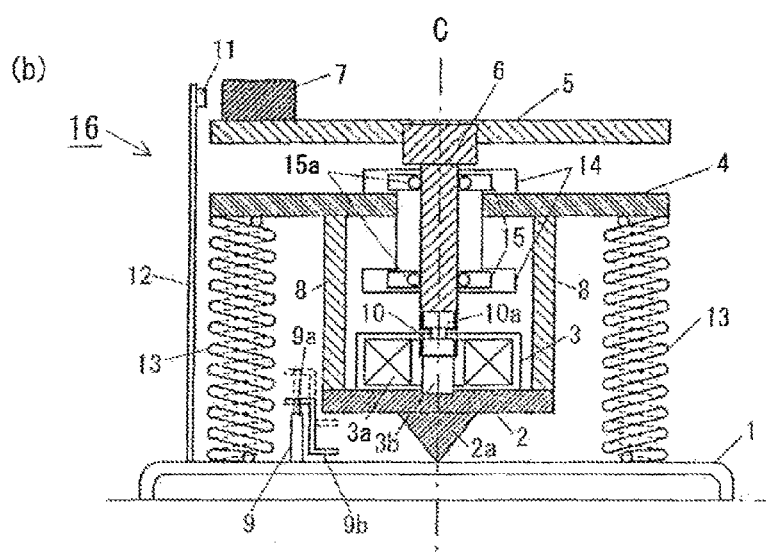

FIG. 1 shows an eccentrically rotating apparatus 16. FIG. 1(a) is the perspective view of the apparatus 16 and FIG. 1(b) is the sectional view of the apparatus 16. FIG. 1 shows an embodiment where a generator 3a as a rotating driven body 3 is arranged in the eccentrically rotating apparatus 16. The rotating driven body 3 is not limited to the generator 3a, but other components such as a pump and the like can be arranged.

A movable unit of the eccentrically rotating apparatus 16 shown in FIG. 1(a) comprises a table 5 arranged in an upper position, a bearing board 4 arranged in a intermediate position and a support board 2 arranged in a lower position. These 3 components have the same central axis C and are arranged on a base plate 1 with predetermined spaces apart each other. The eccentrically rotating apparatus further comprises a weight 7 eccentrically fixed to the table 5, a sensor 11 for detecting a position of the weight 7 and a weight lifting cylinder 9 as a driving unit activated upon a receipt of a detecting signal from the sensor 11.

A support tip 2a is fitted to the center of the bottom surface of the support board 2 and a rotating driven body 3 is fixed to the center of the top surface of the support board 2. The support tip 2a is formed in a cone or in a hemisphere and arranged on the base table 1 such that the support board 2 is supported by an apex portion of the support tip 2a. The support board 2 is connected to a support pole 6 of the table 5 via a universal joint 10a of a joining device 10, which is fitted to a shaft 3b of the generator 3a as the rotating driven body 3. The support board 2 is movably supported on the base plate 1 via the apex portion of the cone or the hemisphere of the support tip 2a, the movable unit of the eccentrically rotating apparatus 16 can be freely tilted and moved. The universal joint 10a of the joining device 10 transmits only axial rotations of the support pole 6 to the shaft 3b of the generator 3a. In order to disconnect temporally the support pole 6 from the shaft 3b of the generator until the table 5 stably is rotated, a clutch may be arranged. The generator 3a can generate power corresponding to rotations of the table 5.

The bearing board 4 and the support board 2 are connected integrally via plurality of pillars 8. The bearing board 4 is arranged on and fixed to a plurality of support springs 13, which are circularly arranged on and fixed to the base plate 1, so that the bearing board 4 is evenly and elastically supported by the respective support springs 13. In the center part of the bearing board 4, a shaft holding device 14 for movably holding the support pole 6 of the table 5 is arranged. As shown in FIG. 1(b), as the shaft holding device 14, a bearing unit 15 comprising bearings 15a arranged at two places is fitted in a center hole of the bearing board 4. Since the bearing board 4 is connected to the table 5 via the bearings 15a arranged upper and lower portions of the bearing unit 15 and also via support pole 6 which is held by the bearings 15a, and since the bearing board 4 is fixed to the base plate 1 via the springs 13, the bearing board is not rotated even if the table 5 is rotated. In stead of the bearing unit for the shaft holding device, a bushing having low friction and the like can be used. The number of the support springs 13 is determined based on a desired performance of the eccentrically rotating apparatus 16, here the number not is specified.

The weight 7 is eccentrically arranged in the rim of the top surface of the table 5. The table 5 has the support pole 6, which is fixed to the center of the table 5 and is rotatably held by the bearing unit 15 of the bearing board 4. When the table 5 is rotated, since the center of the gravity is shifted as the table 5 is rotated due to the eccentrically arranged weight 7, the support pole 6 is tilted in a predetermined angle from the central axis C.

The weight 7 of the eccentrically rotating apparatus 16 is moved upward and downward by a combination of the sensor 11 and the weight lifting cylinder 9. The sensor 11 is attached to an upper end of a sensor fitting arm 12 fixed to the rim of the base plate 1. The sensor 11 detects positions of the revolving weight 7 and outputs signals to drive the weight lifting cylinder 9. Upon receipt of the signal, the cylinder 9 is driven so as to extend a rod 9a, so that the support board 2 is raised by an L shaped hook 9b attached to the top of the rod 9a. As the support board 2 is raised, the rotating weight 7 is raised from the lowermost point to the top point, so that eccentric rotations accompanied by the precessional movements of the table 5 are caused. The weight lifting cylinder 9 is driven by compressed air, electromagnetic coils or hydraulic oil which is activated by an open-close valve, an on-off switch or the like upon receipt of the signals from the sensor 11 indicating that the weight 7 is located at the lowermost point.

The weight lifting cylinder 9 is aimed to move the movable unit of the eccentrically rotating apparatus 16 instantly, so that a raising or lowering mechanism of the rod 9a is not limited to utilize the L-shaped hook 9b. The rotated number of the table 5 is increased by a combination of the number the weight lifting cylinders 9.

Hereinafter, the eccentric rotations and the precessional movements of the table caused by the weight 7 are explained.
<Generation of Eccentric Rotation>

Figure 2:
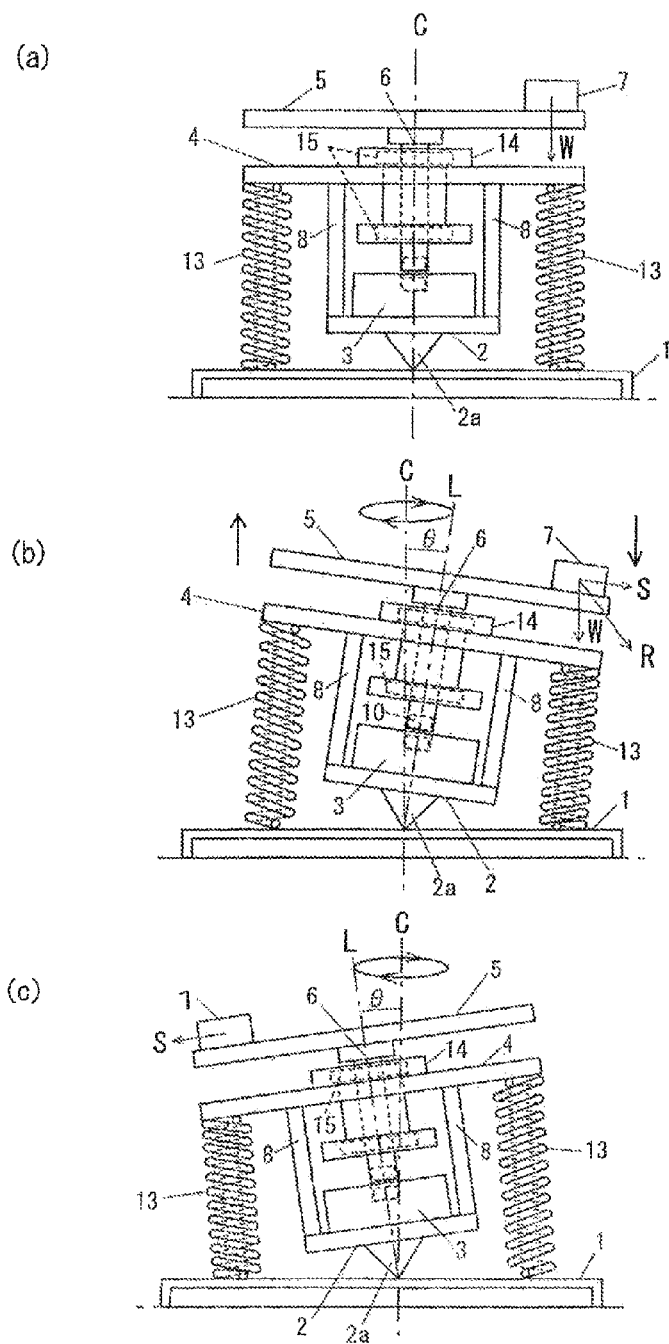
FIG. 2 is views for explaining eccentric rotations caused by a weight eccentrically arranged on a table, wherein: (a) shows a neutral state of the table and the weight, (b) shows a rightward tilted state of the table and (c) shows a leftward tilted state of the table.

FIG. 2 is views for explaining eccentric rotations caused by the weight 7 eccentrically attached to the table 5. When the table 5 shown in FIG. 2(a) is started being rotated, the rotational axis and the center of the gravity of the table is deviated by a gravitational force W acted on the weight 7 attached to the rim of the table 5, so that the rotational axis of the support pole 6 is tilted toward the weight 7 from the central axis C. As shown in FIGS. 2(b) and (c), as a result of balance among the gravitational force acted on the weight 7 and elastic forces of the springs 13, the rotational axis of the support pole 6 of the table 5, as an eccentric rotational axis L is tilted by a degree of θ.

When initial rotational force is acted on the table 5 positioned in a state shown in FIG. 2(a), the table is started the eccentric rotations by eccentric torque R as a result of synthesizing the gravitational force W of the weight 7 and a centrifugal force S as shown in FIG. 2(b). However, the weight 7 contributes to generate the eccentric rotations of the table 5 only when the table is started from the state shown in FIG. 2(a). After that the eccentric rotational state takes a state shown in FIG. 2(c) where the weight 7 is located at the lowermost point, so that the table 5 is rotated only by the centrifugal force S, but the weight 7 has no effects to continue the eccentric rotations.
<Eccentric Rotation Accompanied by Precessional Movement>

Figure 3:
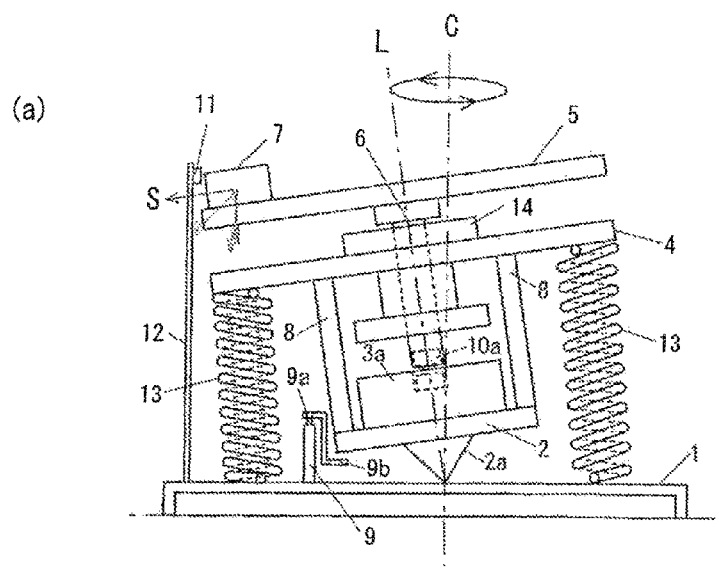
FIG. 3 is views for explaining eccentric rotations accompanied with precessinal movements of the eccentrically rotating apparatus, wherein: (a) shows a state where the weight is positioned at the lowermost point and (b) shows a state where the weight is positioned at the uppermost point.
Figure 3:
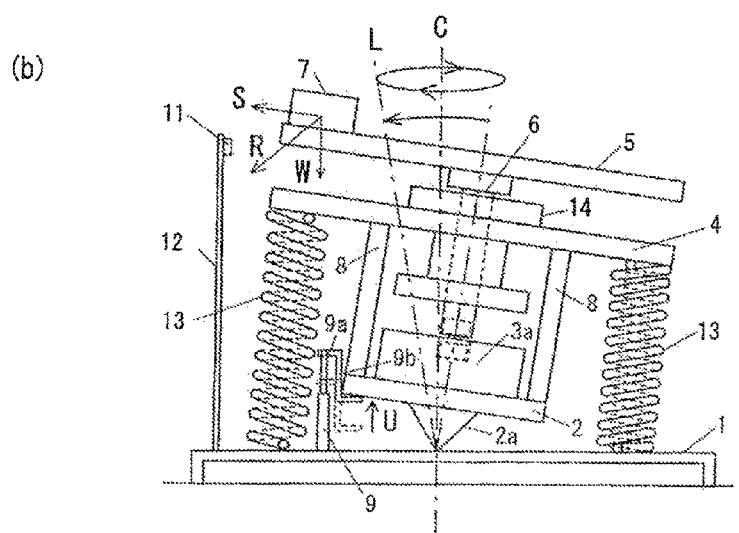

The precessional movements, which are necessary to continue the eccentric rotations, attained by utilizing falls of the weight 7 are explained as referring to FIG. 3. When the sensor 11 of the eccentrically rotating apparatus 16 detects the position of the weight 7 arranged in the eccentrically rotating table 5, the weight 7 is precessionally moved upward and downward by extending and shortening the arm 9a of the weight lifting cylinder 9.

When the table 5 is positioned at a state shown in FIG. 3(a), the sensor 11 detects the weight 7 on the table located at lower most point rotated by the centrifugal force S and outputs the detecting signal. As shown in FIG. 3(b), the weight 7 of the table 5 is instantly pushed upward from the lowermost point by an extending force U of the rod 9a of the weight lifting cylinder 9 which is activated upon a receipt of the detecting signal from the sensor 11. At the same time the central axis of the support pole 6 is deviated from the eccentric rotational axis L. The eccentric torque R, which is the synthesized result of the gravitational force W of the weight 7 and the centrifugal force S, acts upon the support pole 6 so as to shift the central axis of the support pole 6 to the eccentric rotational axis L. Thus the eccentric torque R accelerates the eccentric rotations of the table 5 and returns the central axis of the support pole 6 to a position of the eccentric rotational axis L. An eccentric rotated rate of the table 5 reaches a maximum rate during a precessional procedure when the weight 7 falls from the uppermost point to the lowermost point.

The precessional movements of the table 5 are also influenced by elastic forces of the support springs 13. Since the bearing board 4 is fitted to the support springs 13, repulsion forces from the support springs 13 acted on the bearing board 4 anytime when the weight 7 is moved upward or downward, so that the required extending force U by the cylinder 9 to lift the weight 7 can be reduced, in other words, necessary amount of the compressed air to extend or shorten the rod 9a can be reduced.

The precessional movements of the table 5 accompanied by the eccentric rotations are transmitted to the shaft 3b of the generator 3a fixed to the support board 2 via the universal joint 10a, which transforms the eccentric rotations into fixed shaft rotations. Stresses might be generated in the support pole 6 due to eccentric forces and vibrations caused by the precessional movements accompanied by the eccentric rotations. However, such stresses are absorbed by the elasticity of the support springs 13 of the bearing board 4, and by the cone or hemisphere structure of the support tip 2a of the support board 2, because the bearing board 4 as well as support board 2 can freely tilted due the cone or hemisphere structure of the support tip 2a. As a result, since stresses acting on the shaft 3b of the generator 3a are reduced, only smooth axial rotations are transmitted to the rotating driven body 3 such as the generator 3a and the like via the universal joint 10a.

Figure 4:
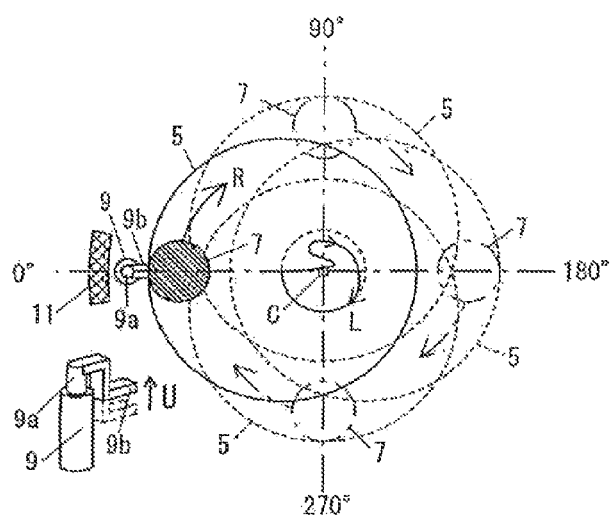
FIG. 4 is views for explaining eccentric movements of the weight accompanied with precessional movements of the apparatus caused by the weight, wherein: (a) shows a positional relation between the weight on the table and a weight lifting cylinder and (b) is a timing chart showing a detected signal by a sensor, a movement of the weight lifting cylinder and a moving track of the weight.
Figure 4:
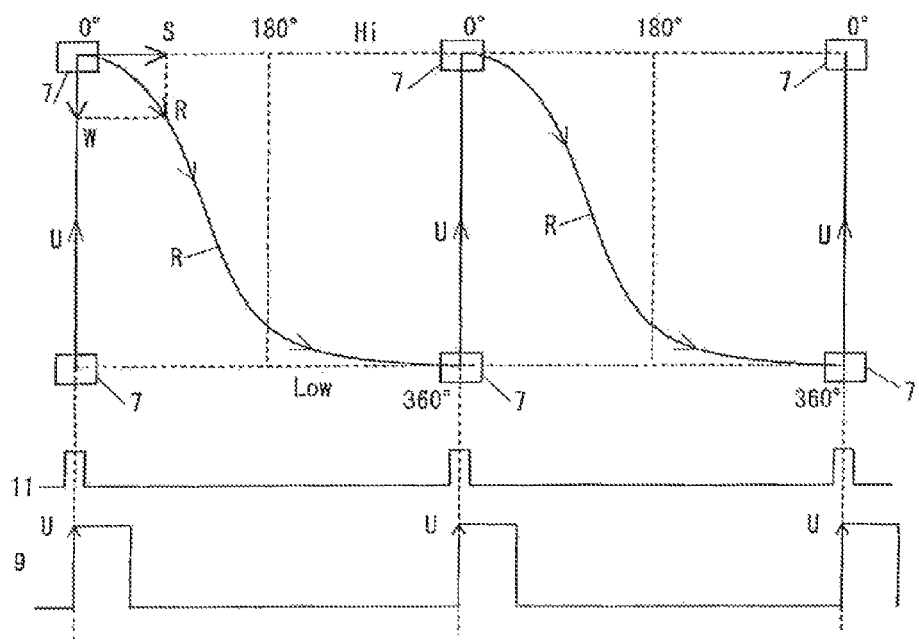

FIG. 4 is views for explaining eccentric movements of the table 5 accompanied with precessional movements of the apparatus where only one pair of the 11 and the weight lifting cylinder 9 is arranged in the apparatus. FIG. 4(a) shows positional changes of the precessional revolutions of the weight 7 on the table 5. FIG. 4(b) is the timing chart showing the moving tracks of the weight 7 in a vertical direction, which is lifted by the cylinder 9 upon receipt of detected signals from the sensor 11.

As shown in FIG. 4(a), when the sensor 11 detects the weight 7, the weight lifting cylinder 9 is activated to push up the weight 7 to the apex by its extending force U, so that the table 5 is rotated by the eccentric torque R which is the synthesized result of the gravitational force W and the centrifugal force S acted on the weight 7. When the table 5 is rotated one turn, the weight 7 is revolve precessionally as being moved upward and downward in one cycle.

When the sensor 11 detects the weight 7 positioned at a lowermost point (Low), the weight 7 is pushed up to the apex (Hi) by the extending force U of the rod 9a of the cylinder 9, so that potential energy of the weight 7 is increased. Due to the increased potential energy of the weight 7, the precessional rotations of the table 5 are accelerated. The accelerated processional rotations of the table are continued to push up the weight 7 from the lowermost point to the apex repeatedly by the extending force U of the rod 9a of the cylinder 9 upon receipt of the detected signals from the sensor 11. The eccentric rotations accompanied by the precessional rotations of the table 5 bare caused by the upward and downward movements of the weight 7, which is a characteristic feature of the eccentrically rotating apparatus 16 by the present invention.

Hereinafter, a configuration for increasing the number of rotations of the eccentrically rotating apparatus 16, comprising a plurality of pairs of the censors 11 and the cylinders 9 is explained. Depending on specifications such as the size of the table 5, the cylinders 9 can be increased with its number in order to increase the number of the rotations of the table 5.

Figure 5:
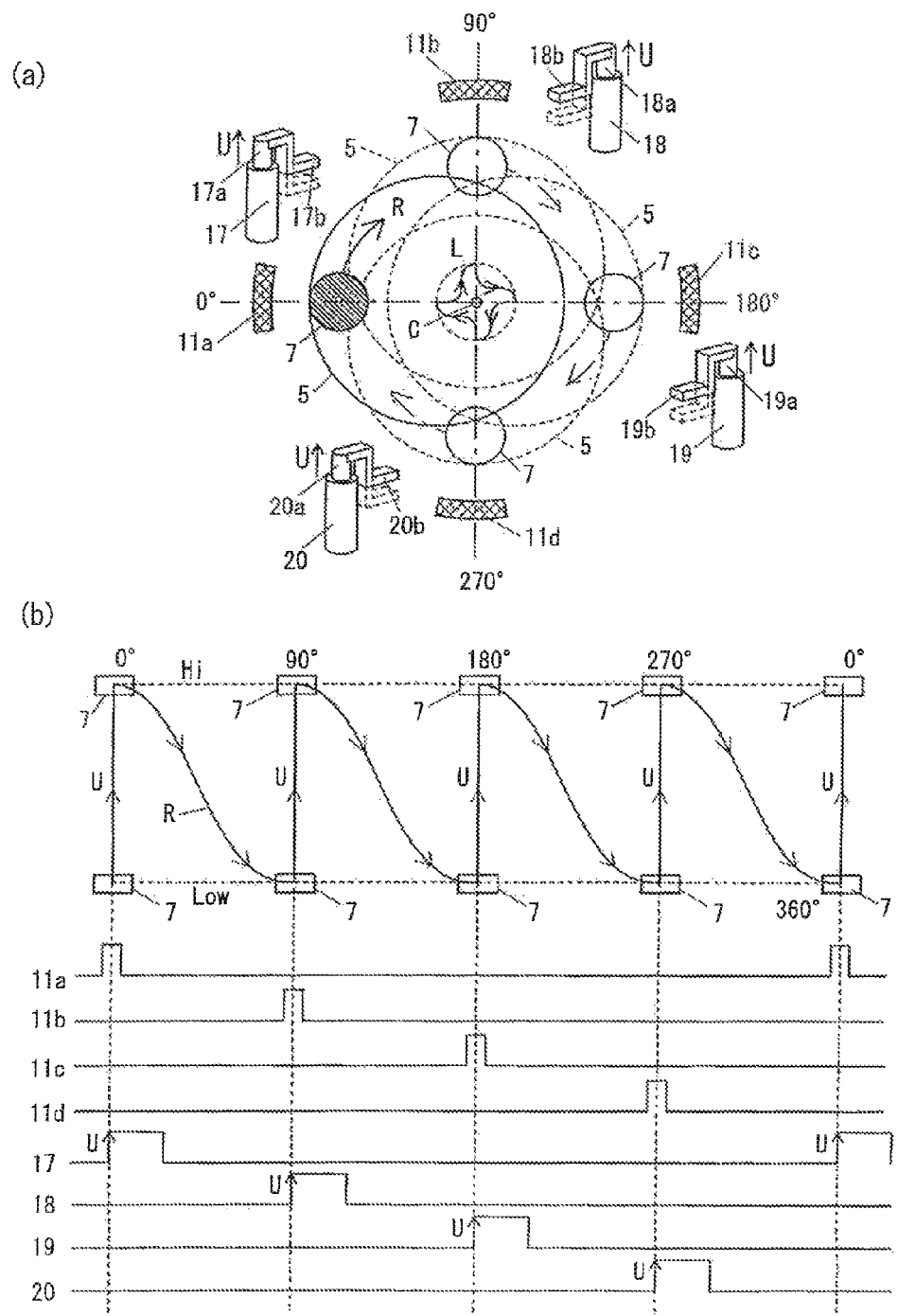
FIG. 5 is views for explaining eccentric movements of the weight accompanied with precessional movements of the apparatus caused by the weight, wherein: (a) shows positional relations between the weight on the table and 4 weight lifting cylinders and (b) is a timing chart showing detected signals by 4 sensors, movements of the 4 weight lifting cylinders and moving tracks of the weight.

FIG. 5 shows an example of eccentric rotations of the table 5 accompanied with precessional movements attained by four pairs of sensors 11a, 11b, 11c, 11d and cylinders 17, 18, 19, 20 arranged on the table 5 with 90° apart each other. In this arrangement, although strokes of upward and downward movements of the weight 7 are shortened, the number of upward and downward movements of the weight 7 is increased, so that the number of the rotations of the table 5 is increased.

FIG. 5(a) shows the track of the weight 7 on the table 5 and the circularly arranged pairs of the sensors 11a, 11b, 11c, 11d and the cylinders 17, 18, 19, 20. FIG. 5(b) is the timing chart showing detected signals of the weight 7 by the sensors 11a, 11b, 11c, 11d, and extending and shortening movements of rods 17a, 18a, 19a, 20a of the respective cylinders 17, 18, 19, 20. In this arrangement, when the weight 7 on the table 5 is revolved one turn, the table 5 is eccentrically rotated one turn accompanied with 4 precessional movements.

As shown in FIG. 5(b), the sensors 11a, 11b, 11c, 11d are arranged at the lowermost points (Low) of the weight 7, where the respective sensors 11a, 11b, 11c, 11d detect the weight 7 and the corresponding cylinders 17, 18, 19, 20 are activated one after the other. The weight 7 is pushed up from the lowermost point (Low) to the uppermost point (Hi), so that potential energy of the weight 7 is increased. Although the increased potential energy of the weight 7 in FIG. 5 is less than that in FIG. 4, the number of the rotations of the table 5 is increased because of the increased number of the push up movements of the weight 7. And since extending force U of the cylinders 17, 18, 19, 20 is set less than the case of FIG. 4, amount of compressed air to be supplied to the respective cylinders can be reduced.

A photo-sensor can be employed as the sensor 11. As far as the sensor can detect positions of the weight 7, since the plurality of the cylinders can be controlled by the detected signals by the sensors, the number and type of the sensors are not necessarily determined.

The shapes of the table 5, the bearing board 4 and the support board 2 are not limited to a circular disk, but a polygonal shape such as an octahedral shape can be used. The structure connecting the support board 2 with the bearing board 4 can be a cylinder surrounding the support board 2. The number of the support springs 13 is not limited to four, but the number can be varied, for example, 4, 6, 8 or the like depending on the size and the weight of the movable unit of the eccentrically rotating apparatus 16.

Thus the present invention can provide the eccentrically rotating apparatus accompanied with the precession movements utilizing the eccentric torque. The apparatus by the present invention can reduce stresses acting on the supporting pole of the table, so that smooth continuous rotations can be obtained.

REFERENCE NUMERALS AND CHARACTERS

1 Base Plate
2 Support Board
3 Rotating driven body
4 Bearing Board
5 Rotating table
6 Support Pole
7 Weight
8 Support Pillar
9 Cylinder
10 Connecting Device
11 Sensor
12 Sensor Fixing Arm
13 Support Spring
14 Shaft Holding Device
15 Bearing Unit
16 Eccentrically rotating apparatus
17-20 Cylinders
C Central Axis
L Eccentric Rotating Axis
R Eccentric Torque
S Centrifugal Force
U Extending Force
W Gravity Force

What is claimed is:

1. An eccentrically rotating apparatus, comprising:
a rotating table, a bearing board and a support board spaced apart from each other in a vertical direction and coaxially arranged on a base plate; wherein:
said rotating table comprises a support pole and a weight;
said bearing board comprises a shaft-holding device rotatably holding said support pole; and
said support board comprises a support tip connected to said bearing board with a predetermined space apart and movably arranged on said base plate, and a rotating driven body comprising a connecting device connected to said support pole;
further comprising a plurality of springs connected to said base plate for supporting said bearing board, a sensor for detecting a position of said weight and a driving unit activated by detected signals from said sensor;
wherein said rotating table is eccentrically rotated such that said driving unit pushes up said support board when said sensor detects said weight.

2. The apparatus according to claim 1, wherein:
said connecting device comprises a universal joint connecting said support pole movably with said support board or a clutch disconnecting said support pole from said support board.

3. The apparatus according to claim 1, wherein:
said rotating driven body is fixed to said support board and comprises a generator or pump connected to said rotating table via said support pole and said connecting device.

4. The apparatus according to claim 1, further comprising a plurality of driving units and sensors.

* * * * *